May 18, 1971     I. MAVROVIC     3,579,636

UREA SYNTHESIS PROCESS

Filed May 16, 1968     3 Sheets-Sheet 1

FIGURE 1

INVENTOR.
*Ivo Mavrovic*
BY
*Robert D. Spurr*
Attorney

FIGURE 2A

United States Patent Office 3,579,636
Patented May 18, 1971

3,579,636
UREA SYNTHESIS PROCESS
Ivo Mavrovic, 530 E. 72nd St., New York, N.Y. 10021
Filed May 16, 1968, Ser. No. 729,764
Int. Cl. C07c *127/00*
U.S. Cl. 260—555
11 Claims

ABSTRACT OF THE DISCLOSURE

Urea recycle process in which water content of recycled $NH_3$ and $CO_2$ is reduced and conversion in urea reactor is increased. Major portion of the heat of reaction generated from the condensation of the recycled $NH_3$ and $CO_2$ gases to form an aqueous ammonium carbamate solution is recovered in heat exchange with reactor feed streams, to produce steam in a reactor coil. Heat generated in a urea synthesis reactor is used in one or more related operating units including ammonium carbamate decomposers, thus providing an efficient process heat balance.

BACKGROUND OF THE INVENTION

This invention has to do with the synthesis of urea from ammonia and carbon dioxide. More particularly, improvement has been realized in a carbamate recycle urea synthesis process by reducing the water content of ammonia and carbon dioxide recycled therein.

As described in U.S. Pats. Nos. 3,172,911 and 3,270,050, ammonia and carbon dioxide are reacted in a reactor at elevated pressure and elevated temperature to form urea. In this synthesis an intermediate compound, ammonium carbamate, is formed which then loses one molecule of water to yield urea. Only a part of the carbon dioxide charge is converted to urea and the remainder is present in the reactor effluent as unconverted ammonium carbamate. This unconverted ammonium carbamate and the excess ammonia (charged to improve the conversion to urea) are usually separated from the urea solution constituting the reactor effluent by heating the effluent to decompose the carbamate into ammonia and carbon dioxide, followed by expulsion of the gases from the solution. This is usually accomplished in two sequences of decomposition and gas separation. A first decomposing vessel and a first gas separator are usually operated at about 250–350 pounds per square inch gauge (p.s.i.g.) and 295–340° F. A second decomposing vessel and a second gas separator are operated at 8–25 p.s.i.g. and 210–260° F. The resulting degassed urea solution from the second gas separator can then be processed further as for the production of solid urea prills or mixed fertilizers. The ammonia and carbon dioxide gases are recovered from each of the gas separators and are recycled to the reactor.

Unfortunately, a relatively large amount of water is carried along with the recovered gases, $NH_3$ and $CO_2$, which are usually condensed in a body of an aqueous ammonium carbamate solution. This is particularly pronounced when mole ratios of above 2.5/1 of $NH_3/CO_2$ are employed in the reactor. The reaction system finds its own equilibrium at a relatively high water content in the recycle gases. This excess water is passed through the system to the reactor, thus reducing substantially the conversion per pass of carbamate to urea and thereby making the process uneconomical. The ammonia and carbon dioxide gases, recovered from both decomposing vessels, are usually condensed to a liquid phase and recycled back to the reactor as an ammoniacal aqueous solution of ammonium carbamate. The exothermic heat of condensation and reaction is usually rejected to the cooling water and is removed from the system. This type of process is thermally very inefficient.

Only a very small amount, about 5% of the heat is recovered in such urea synthesis processes by indirectly using a part of this heat of condensation to preheat the liquid $NH_3$ reactor feed stream to about 150° F., for the purpose of bringing the reactor mixture up to 375° F. and to maintain it at that level.

In another prior art modification, a reactor coil is used substantially only for the purpose of removing the exothermic overall heat of reaction of urea formation from liquid $NH_3$ and liquid or gaseous $CO_2$ available in a so-called once through process, in which no carbamte is re-recycled to the reactor for recovery. The liquid $NH_3$ feed to the reactor in this case is usually maintained as low in temperature as practically possible, to reduce the reactor cooling requirements.

The liquid carbamate total recycle urea process, however, at the usual 3.5–4.0 to one ammonia to $CO_2$ overall mol ratio in the reactor, is slightly endothermic due to the relatively cold recycle carbamate solution which is fed to the reactor. This solution is heated adiabatically in the reactor from about 190° F. to about 375° F. and it absorbs all of the exothermic heat of reaction otherwise available in a once through urea process running on $NH_3$ and $CO_2$ alone, without carbamate recycle. A relatively small amount of heat must be still added to the reactor in a total recycle process, in order to maintain the reactor temperature constant at about 375° F. This heat is normally added to the reactor by slightly preheating the liquid $NH_3$ stream to the reactor.

SUMMARY OF THE INVENTION

In accordance with the present invention, there is provided a process which allows for the use of higher $NH_3/CO_2$ operating molar ratios in the reactor for attaining a higher conversion per pass therein. The process comprises:

Reacting ammonia and carbon dioxide in a reactor to form a first reaction product containing urea, water, ammonium carbamate and unreacted ammonia, Passing the first reaction product into a decomposing vessel and heating it therein to decompose the ammonium carbamate to ammonia and carbon dioxide and to form a second reaction product containing urea, water, ammonium hydroxide, residual ammonium carbamate, ammonia gas, carbon dioxide gas and water vapor, Passing the second reaction product into an intermediate section of a separator wherein urea and water are separated from ammonia, carbon dioxide and water vapor, and Recycling the ammonia and carbon dioxide to form urea, wherein A major portion of the first reaction product is passed into the decomposing vessel, and a minor portion of said first reaction product at a lower temperature than the second reaction product is passed into an upper section of said separator countercurrent to the gaseous phase of said second reaction product passing upwardly therein, whereby a substantial portion of the water vapor of said second reaction product is condensed and is separated from the ammonia and the carbon dioxide of the gaseous phase of said second reaction product.

Furthermore, in accordance with the present invention, a major portion of the heat of recycle $NH_3$ and $CO_2$ condensation is utilized within the process and is exchanged internally to produce valuable steam at a usable temperature level. Instead of rejecting this heat of condensation at a low temperature level via the cooling water (at 110–120° F.) this invention utilizes the major portion of this heat of condensation and recycles it back to the reactor via the reactor feed streams to produce in intermediate section of second separator 43, which is equipped with a tray section 44.

Figure 1:
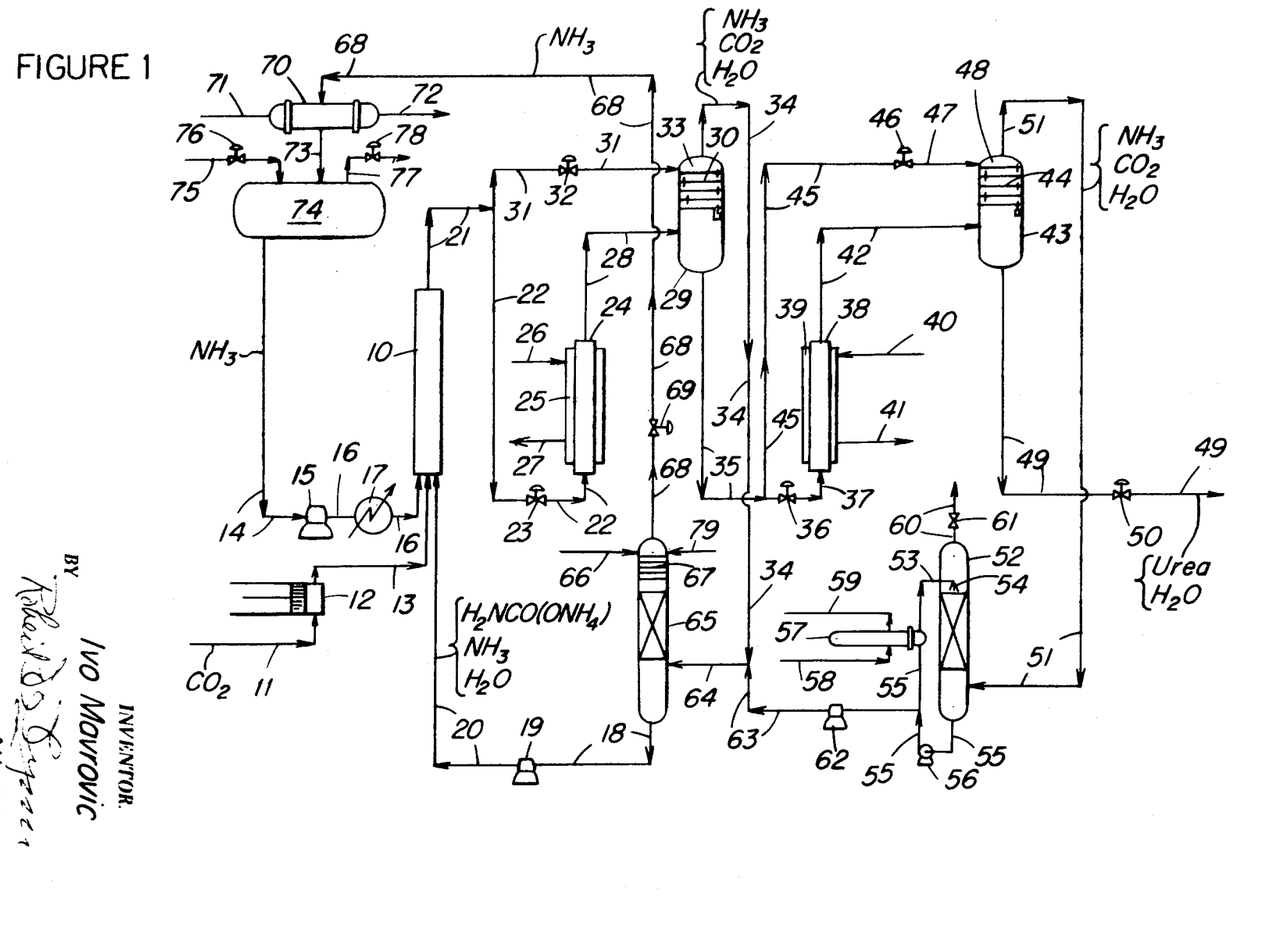

A minor portion of stream 35 is passed through line 45 and flow control valve 46. As the stream is flashed through valve 46, the temperature thereof is lowered as from 320° F. to about 210° F. The cooler stream flows from valve 46 through line 47 to an upper section 48 of separator 43. In separator 43, the cooled stream flows countercurrent to the upwardly flowing gaseous phase of the third reaction product therein and, as a result, the major portion of water vapor in the gaseous phase is condensed. An aqueous solution of urea containing a small amount of biuret (formed as a by-product of urea), residual ammonium carbamate and ammonia, is removed from separator 43 through line 49 containing level control valve 50. Urea can be removed from this mixture by conventional means (not shown). The mixture comprises, in weight present:

Urea _______________________________________ 7.50
$H_2O$ _______________________________________ 23.1
$NH_3$ _______________________________________ 0.6
$H_2NCO(ONH_4)$ _____________________________ 1.0
Biuret ______________________________________ 0.3

The overhead product removed from separator 43 through line 51 contains $NH_3$, $CO_2$ and a relatively minor amount of water, 30 mole percent, in contrast to 65 mole percent of water in the gaseous phase of the third reaction product passed into separator 43. The overhead product, at 220° F., is passed into a lower section of absorber 52 and flows upwardly therein in counter-current relation to a circulating solution of aqueous ammoniacal carbamate solution, which condenses and absorbs the gaseous phase. The latter solution, at 90° F., is passed into absorber 52 through line 53 containing spray nozzle 54, and is removed through line 55, containing pump 56 to cooler 57. The ammonium carbamate solution in cooler 57 is cooled by water at 80° F., passed through the jacket thereof through inlet 58 and outlet 59. Inerts, principally $N_2$ and $H_2$, are removed from absorber 52 through overhead line 60 containing valve 61.

A portion of the ammonium carbamate solution in line 55 is pumped by pump 62 through line 63 to line 64 wherein it is combined with the overhead gas from separator 29 in line 34. The combined stream in line 64 is passed into a lower section of absorber 65 and the gaseous phase flows upwardly therein to contact a countercurrent stream of reflux liquid ammonia which is passed into absorber 65 through line 66. Absorber 65 is shown with reflux section 67 positioned in an upper section thereof. Aqueous ammonium carbamate enriched with $NH_3$ and additional carbamate, and containing only a minor amount of water is removed from absorber 65 through line 18 and thence pump 19 and line 20 to reactor 10. The solution in line 18 comprises, in weight percent:

$H_2NCO(ONH_4)$ _____________________________ 56.7
$NH_3$ _______________________________________ 23.3
$H_2O$ _______________________________________ 20.0

Substantially pure ammonia gas separated from $CO_2$, is taken overhead from absorber 65 through line 68 containing valve 69 to condenser 70. Cold water at 80° F. is circulated through the shell of condenser 70 via lines 71 and 72 to control the temperature thereof. Liquid ammonia is passed from condenser 70 through line 73 to ammonia storage 74 from which it can be taken through units 14–17 to reactor 10. Liquid ammonia is added to storage 74 through line 75 containing valve 76. Inerts, such as $N_2$, $CH_4$, $H_2$ and $O_2$, in storage tank 74 by virtue of their presence in ammonia streams 73 and 75, can be removed from the system through line 77 controlled by valve 78.

As shown in connection with absorber 65, a small amount of steam condensate at 100° F. is added from line 79 above tray section 67 therein. Such condensate is an aid to improved ammonia gas purification from $CO_2$ in tray section 67 of absorber 65.

As shown in this example, illustrated by FIG. 1, a conversion of 68–70 mole percent of $CO_2$ can be maintained by reducing the water content of streams 34 and 51 such that the water content of stream 20 is approximately 34–35 mole percent.

Comparative Example A

When streams 31 and 45 are eliminated, and the entire streams 21 and 35 are introduced into decomposing vessels 24 and 38, respectively, the water contents of streams 34 and 51 are undesirably high, with the result that stream 20 has a water content of about 40 mole percent. Further, the conversion in reactor 10 is only about 60–62 mole percent of $CO_2$. Otherwise all conditions are substantially the same as in Example 1.

Example 2

Figure 2A:
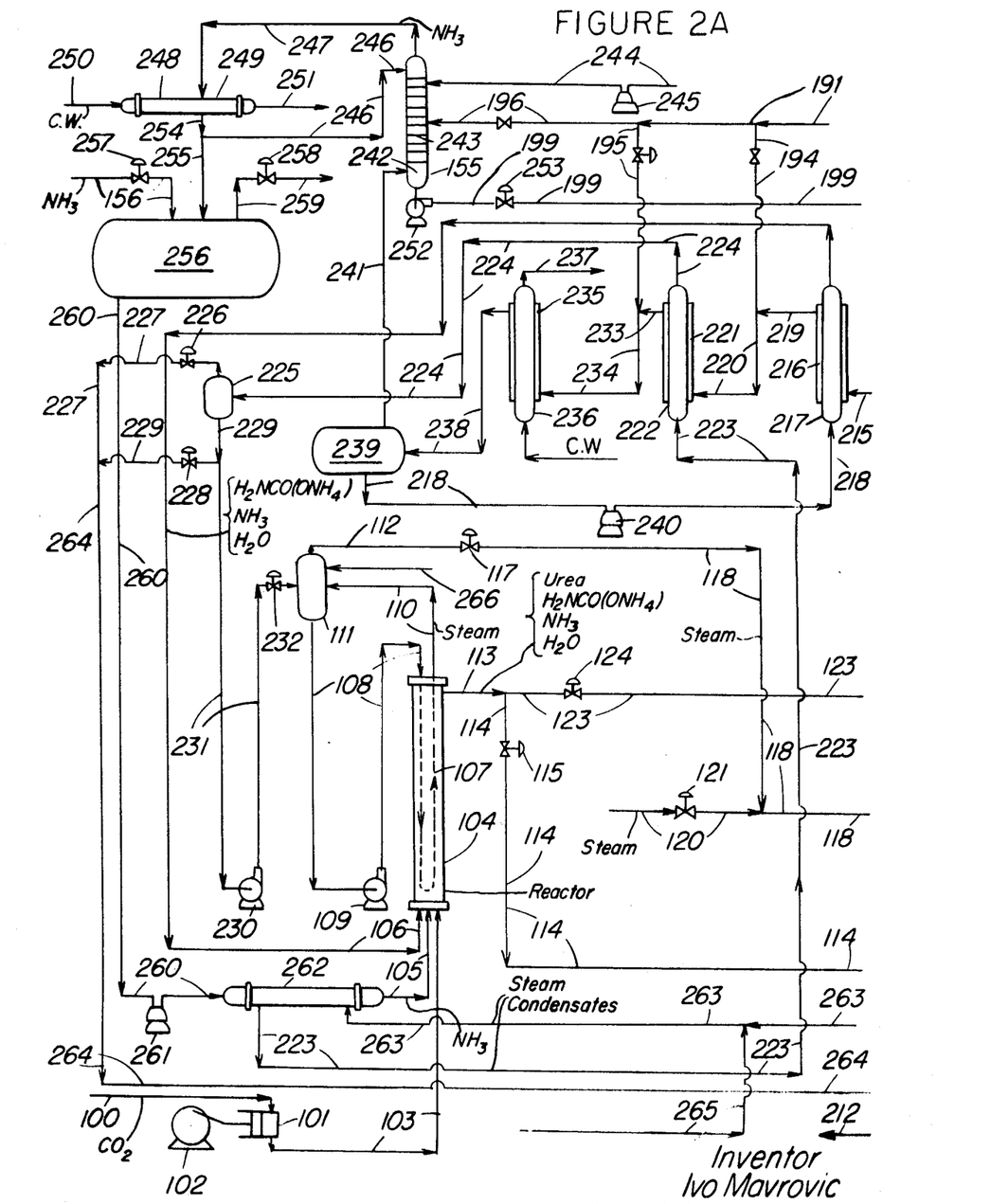
Figure 2B:
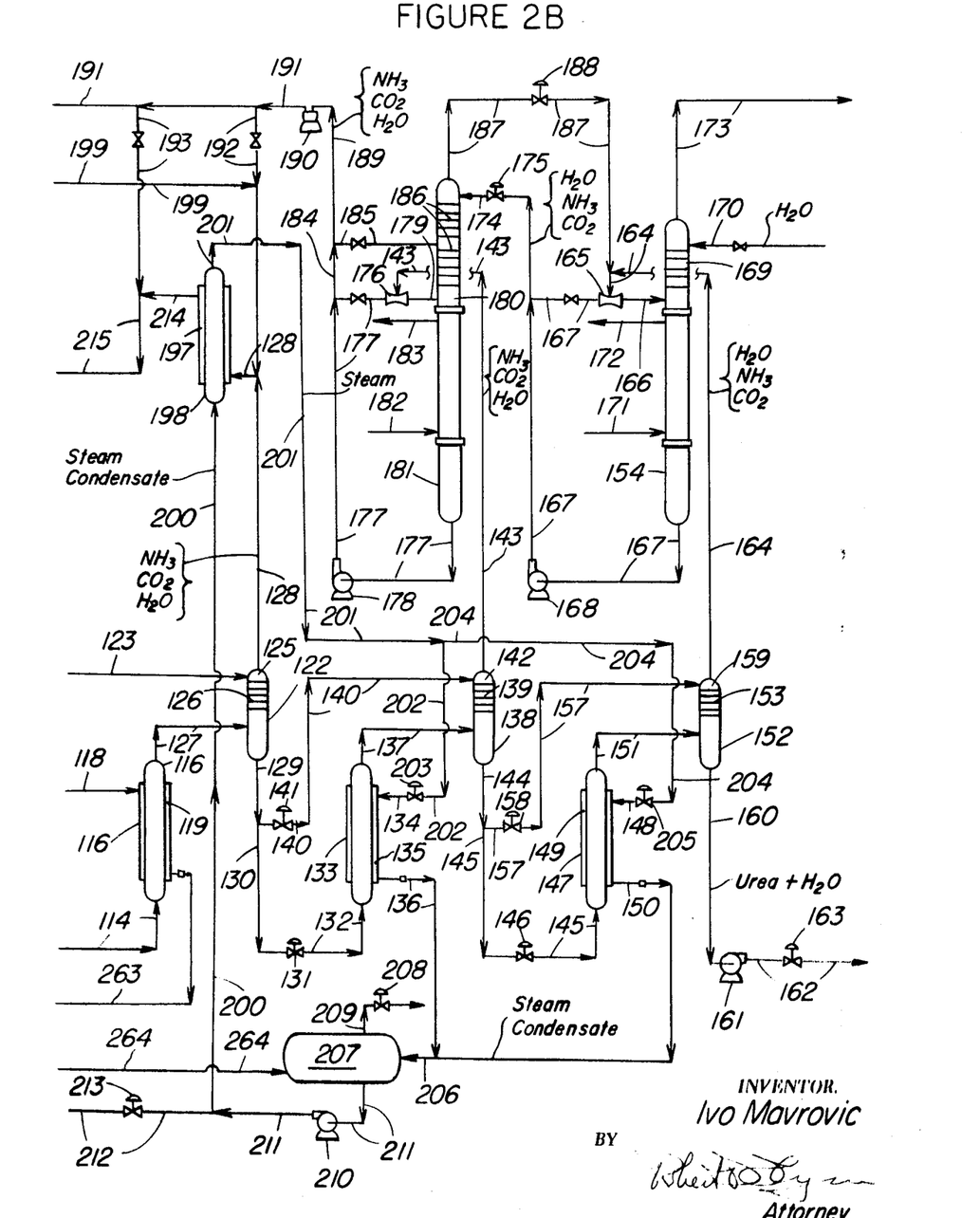

As illustrated by FIG. 2, carbon dioxide (4416 parts) is passed from line 100 to compressor 101 operated by motor 102, to line 103 and into the bottom of high pressure reactor 104. Liquid $NH_3$ (7230 parts) in line 105 and ammoniacal carbamate solution in line 106 are also passed into the bottom of reactor 104. The reactor is provided with steam producing coil 107, which is immersed in the resulting reaction mixture therein, for the purpose of removing the exothermic heat of reaction and thus of maintaining the reactor operating temperature constant. Steam condensate in line 108 is delivered by pump 109 to coil 107, and the resulting steam is passed from coil 107 to line 110 and thence to steam drum 111. Steam so produced can be flashed from drum 111 through line 112 for use in one or more other operating units in the process as described hereinafter.

Reaction temperatures and pressures in reactor 104 are about 370° F. and about 3200 p.s.i.g., respectively.

The reactor effluent stream 113 has the following composition, in weight percent, indicating an overall $CO_2$ conversion per pass of 70 percent:

Urea _______________________________________ 34.4
$CO_2$ _______________________________________ 10.8
$NH_3$ _______________________________________ 37.8
$H_2O$ _______________________________________ 17.0

A major portion (about 80 percent by volume) of stream 113 is passed through line 114 containing pressure control valve 115, which serves to maintain reactor pressure constant in reactor 104. The pressure of the stream in line 114 is reduced from 3200 p.s.i.g. to 330 p.s.i.g. in passing through valve 115; this stream is then passed into first decomposing vessel 116 which is operated at about 320 p.s.i.g. and 320° F. Steam, 150 p.s.i.g., is passed from line 112 through reactor temperature control valve 117 to line 118 and to the shell 119 of decomposer 116 and thus heats the latter.

The flow of additional or make-up steam is supplied to line 118 from line 120 controlled by temperature control valve 121 which, in turn, is controlled by the temperature of the solution in the lower portion of separator 122. A sufficient quantity of steam is supplied from line 120 to maintain the said temperature in separator 122 at about 320° F.

The stream in line 114, upstream of valve 115, contains the following materials (in parts):

Urea _______________________________________ 34.4
Water ______________________________________ 17.0
$HN_3$ (excess) ______________________________ 29.5
$H_2NCO(ONH_4)$ _____________________________ 19.1

In decomposer 116, the ammonium carbamate is heated and is decomposed into $NH_3$ and $CO_2$. Excess $NH_3$ and the gases formed from the carbamate decomposition are expelled from the urea solution in decomposer 116. Thus, a gaseous phase containing about 14 percent by The urea solution formed as a liquid phase in separator 152 comprises, in weight percent:

| | |
|---|---|
| Urea | 75.8 |
| $H_2NCO(ONH_4)$ | 0.4 |
| $NH_3$ | 0.2 |
| $H_2O$ | 23.4 |
| Biuret | 0.2 |

This urea solution is removed from separator 152 by means of line 160, booster pump 161 and line 162 containing level control valve 163. This valve serves to maintain a substantially constant liquid level in separator 152. The urea solution in line 162 can be routed to a urea finishing section (not shown) for further processing to solid urea prills, or to storage.

Returning to the gaseous phase separated in separator 152, containing 4 weight percent $CO_2$, 14 weight percent $NH_3$ and 82 weight percent water vapor, this phase is removed through overhead line 164. In contrast to the gaseous phase having a water vapor content of about 86 percent by volume at the intermediate section of separator 152, the gaseous phase in line 164 has a water vapor content of about 82 percent by volume. Gases in line 164 are passed to venturi mixing nozzle 165, then to line 166 and into an upper section of shell and tube, falling film heat exchanger 154. Passed into venturi mixing nozzle 165 is a liquid solution taken from the bottom of exchanger 154 and recirculated through valved line 167 by means of pump 168. Nozzle 165 serves to mix intimately the solution in line 167 with gases from line 164 for better reaction and to create a slightly lower pressure in separator 152 with respect to the internal pressure (about 1 p.s.i.g.) in condenser 154. As a result, more effective degassing of urea product in separator 152 is realized and, therefore, a superior $NH_3$ and $CO_2$ recovery from the urea product solution in separator 152 results.

In exchanger 154, gases from line 164 are absorbed substantially completely and are condensed in the solution from line 167. The exothermic heat of reaction between the gaseous and liquid phases and the exothermic heat of water condensation, are absorbed by a stream of cooling water flowing through the shell side of condenser section 154. Accordingly, stream 164 is substantially completely condensed and the resulting solution is cooled to about 100° F. before it is removed from exchanger 154 through line 167 and a portion thereof is recirculated as mentioned above. Recirculation is used to facilitate cooling and condensation of gases from line 164, and to facilitate indirect transfer of the exothermic heat of gas condensation to stream 171-172 of cooling water flowing through the shell of exchanger 154.

A relatively small amount (1 percent) by volume of inerts comprising $N_2$ and $CH_4$, which can accumulate in the gaseous phase formed above the inlet of line 166 of exchanger 154, enters tray section 169 (or equally, a bubble cap section). The inerts flow upwardly and countercurrently to water introduced from line 170; they are washed free of traces of $NH_3$ and $CO_2$ and are vented to the atmosphere through line 173.

The liquid level in the bottom section of exchanger 154 is maintained substantially constant by withdrawing a regulated portion of the solution in line 167 and passing it through line 174 containing level control valve 175. The solution in line 174 contains, in weight percent:

| | |
|---|---|
| $NH_3$ | 12 |
| $CO_2$ | 4 |
| $H_2O$ | 84 |

Analogous to treatment given to the gases in line 164 as described above, the gases from separator 138 and removed through line 143 are mixed in venturi mixing nozzle 176 with recirculated liquid in valved line 177 pumped by pump 178. The resulting mixture is passed through line 179 to the top of vertical falling film, shell and tube heat exchanger section 180 of vessel 181. The gases in line 143 comprise, in approximate weight percent:

| | |
|---|---|
| $NH_3$ | 62 |
| $CO_2$ | 15 |
| $H_2O$ | 23 |

The gases from line 143 are substantially completely absorbed and condensed upon contact with the solution passed into vessel 181 from line 174. Exothermic heat of reaction between the gases from line 143 and liquid from line 174, and exothermic heat of water condensation, are absorbed by the stream of line 177 and are transferred to a stream of cooling water, at 80° F., flowing from line 182 through the shell side of vessel 181 to line 183. Thus, stream 143 is substantially completely condensed and the resulting solution thereof with stream 174 is cooled to about 100° F. before leaving vessel 181 through line 177.

A portion, about 10 percent by volume, of the solution recirculated through line 177 is passed to line 184 and valved line 185 and is fed to a central portion of tray section 186 of vessel 181. The portion so directed serves to countercurrently wash inerts which may accumulate in the gaseous phase formed at the top of vertical falling film exchanger tubes of vessel 181. The inerts are also washed countercurrently by the solution from line 174 which is fed to the top tray of tray section 186. The inerts are purged from vessel 181 through line 187 containing pressure control valve 188, and are passed to venturi mixing nozzle 165. Such inerts are purged from the system through line 173.

The liquid level of the bottom section of vessel 181 is maintained substantially constant by withdrawing a regulated amount of solution from circulating stream 177 and directing it through line 189, then through booster pump 190 wherein the pressure thereof is increased from about 25 p.s.i.g. to about 330 p.s.i.g. The solution in line 189 contains, in approximate parts per weight:

| | |
|---|---|
| $NH_3$ | 42 |
| $CO_2$ | 11 |
| $H_2O$ | 47 |

The solution is discharged from pump 190 through line 191 and is split into five streams into individually valved lines 192, 193, 194, 195 and 196.

With regard now to gas stream 128 containing, in approximate weight percent, 21 $CO_2$, 74 $NH_3$ and 5 water vapor, this stream is fed to the shell side 197 of vertical shell and tube heat exchanger 198. Gas stream 128 is mixed with liquid stream 192 to which has been added liquid stream 199 (source of which is described hereinafter), before it is passed to shell side 197. The gas stream, 128, is partially absorbed in the body of liquid present in shell side 197, which is maintained at about 265° F. The flow of stream 192 is regulated to provide for the highest temperature possible in shell side 197, since an excessive amount of cold stream 192 would cause cooling of the solution in shell 197 as much as would an insufficient amount of stream 192.

Ammonium carbamate and aqueous ammonia solutions are formed in the shell side 197 and heat of reaction thereof is transferred to the tube side of exchanger 198, to which steam condensate is introduced from line 200. The water is evaporated to steam in the tube side and steam is removed through line 201. Part of the steam so produced is passed from line 201 to line 202, temperature control valve 203 and line 134, to the shell side 135 of decomposer 133. The flow of steam in line 202 is regulated by temperature control valve 203 which, in turn, is controlled by the temperature of stream 144 leaving separator 152. Another portion of the steam in line 201 is directed through line 204, temperature control valve 205 and line 148 to be passed into the shell side 149 of second decomposer 147.

The steam condensates in the shell side 135 of decomposer 133, and in the shell side 149 of decomposer 147, exchanger 262 via line 223 at about 120° F. and it is then passed to the tube side of exchanger 222. It is heated therein to about 245° F. and is then passed through line 224 as mentioned earlier. The condensate portion in line 229 is passed to line 264, wherein it is combined with steam and inerts ($N_2$ and $O_2$) from line 227, and the combined stream in line 264 is passed to tank 207.

An additional stream of condensate may be introduced into stream 263 via line 265, or into separator 111 via line 266, or into both. Such additional condensate is withdrawn from the main body of condensate formed in the subsequent urea evaporation or crystal-melting prilling section (not shown) in a treatment of the urea solution from line 162. The additional condensate usually issues from heat exchangers in such evaporation or crystal-melting section at about 320° F., is flashed to a nominally 30 p.s.i.g. condensate collecting tank and is returned to the main boiler plant (not shown) at about 250° F. Recirculation of the additional condensate, supplied at about 320° F. through one or both of lines 265 and 266, through heat exchangers 262 and 222, respectively, provides superior heat recovery within the urea synthesis system illustrated by FIG. 2. The greater the amount of condensate in line 263, the greater amount of heat added to the liquid $NH_3$ feed stream 105 and of steam produced in reactor coil 107, the greater the amount of heat exchanged in exchanger 222 and the smaller the amount of heat rejected to the cooling water stream flowing through the shell side 235 of exchanger 236.

While $CO_2$ is shown as compressed to the reactor pressure and introduced into reactor 104 at its compressor discharge temperature (usually between about 250° F. and about 300° F.), alternative procedures may be used in charging it to reactor 104. It may be charged directly thereto as a liquid. It may also be compressed to reactor pressure and then cooled to about 140° F. in a $CO_2$ compressor discharge cooler (not shown), in order to remove any oil present in the gaseous $CO_2$. In this alternative procedure, this relatively cooler $CO_2$ is preheated to about 250° F. in an additional heat exchanger (not shown) interposed between heat exchangers 222 and 236 in FIG. 2.

By way of comparison of the process illustrated by FIG. 2 with a prior art total urea recycle process, the following advantages in utilities obtain:

|  | Prior art | Figure 2 |
| --- | --- | --- |
| Steam, 150 lbs. lbs./short ton | 2,400 | 1,400 |
| Electricity, kw.-hr./short ton | 140 | 300 |
| Cooling water, gallons/short ton | 18,000 | 8,000 |

Comparative Example B

In comparison with the process illustrated in Example 2 and FIG. 2, the gaseous phase of stream 127 could be reduced in water content to a satisfactory level, one comparable to that of stream 128, by directing the entire stream 113 to the top of tray section 126 of first separator 122. Thus, stream 114 would be eliminated, and the bottom solution in stream 129 would have to be charged to first decomposer 116 in order to be heated and degassed therein. In such case, decomposer 116 would serve as a re-boiler instead of a once through high liquid velocity decomposer. Obviously, the liquid retention time of the urea solution in a re-boiler would be substantially longer than in decomposer 116 as shown in FIG. 2 due to a lower differential head (pressure) available and thus a lower tube velocity. With such a relatively longer retention time, there is greater opportunity for urea to form biuret. In such case, the biuret content of the urea solution withdrawn from the system through line 162 is of the order of about 0.5 percent by weight, in contrast to about 0.2 percent by weight for the solution in stream 162 of FIG. 2.

It is to be understood that the above description, together with the specific examples and embodiments described, is intended to illustrate the invention, and that the invention is not to be limited thereto, nor in any way except by the scope of the appended claims.

I claim:

1. In a urea synthesis process for forming urea by reaction of ammonia and carbon dioxide, wherein ammonia and carbon dioxide are reacted in a reactor to form an aqueous urea solution (A) containing ammonium carbamate and ammonia, said aqueous urea solution (A) is split into a major portion thereof and a minor portion thereof, said minor portion of said aqueous urea solution (A) is cooled, said major portion of said aqueous urea solution (A) is passed to a first ammonium carbamate decomposer wherein ammonium carbamate is decomposed at a temperature of from about 295° F. to about 320° F. to ammonia and carbon dioxide and the resulting gaseous phase containing ammonia and carbon dioxide gases are expelled from said aqueous urea solution (A) together with water vapor and ammonia in said solution (A), and forming a first decomposition product (D) comprising a gaseous phase (B) containing ammonia gas, carbon dioxide gas and water vapor and a liquid phase (C) comprising an aqueous urea solution containing residual ammonium carbamate and urea, the improvement which comprises the sequential steps of passing said first decomposition product (D) containing said gaseous phase (B) and said liquid phase (C) into a lower section of a separator, wherein said gaseous phase (B) is separated from said liquid phase (C) and rises in said separator, said separator being maintained at a pressure of from about 250 to about 350 p.s.i.g., passing said minor portion of said aqueous urea solution (A) at a lower temperature than said gaseous phase (B) into an upper section of said separator countercurrently to said separated rising gaseous phase (B) to heat said minor portion of solution (A) to a temperature above the decomposition temperature of ammonium carbamate in the range of from about 295° F. to about 320° F. to decompose ammonium carbamate in said minor portion of solution (A) to ammonia and carbon dioxide, and to cool said gaseous phase (B), removing said gaseous phase (B) and recovering the resulting aqueous urea solution.

2. The process of claim 1, wherein said ammonium carbamate decomposition product is condensed in indirect heat exchange relation with a steam condensate which is at a pressure of from about 15 to about 25 p.s.i.g. to produce steam, and passing said resulting steam at a pressure of from about 15 to 20 p.s.i.g. in indirect heat exchange relation with an aqueous urea solution (E) containing ammonium carbamate at a temperature of about 250° F. and a pressure of from about 0 to about 25 p.s.i.g., to decompose said ammonium carbamate to ammonia and carbon dioxide.

3. The process of claim 1 including the sequential steps of splitting an aqueous urea solution (E) containing residual ammonium carbamate and ammonia and obtained from a preceding ammonium carbamate decomposer into a major portion (F) thereof and a minor portion (G) thereof, cooling said minor portion of said aqueous urea solution (G), passing said major portion of said aqueous urea solution (F) to a subsequent ammonium carbamate decomposer wherein residual ammonium carbamate is decomposed to ammonia and carbon dioxide and the resulting amomnia and carbon dioxide gases are expelled from said portion of said aqueous urea solution (F) together with ammonia therein, as a subsequent decomposition product comprising a gaseous

UNITED STATES PATENT OFFICE
CERTIFICATE OF CORRECTION

Patent No. 3,579,636         Dated May 18, 1971

Inventor(s) IVO MAVROVIC

It is certified that error appears in the above-identified patent and that said Letters Patent are hereby corrected as shown below:

Column 3, line 54 - in the tabulation heading "Preferrep" should be rewritten as "Preferred", as indicated in specification at page 8, line 7.

Column 5, line 19 - "7.50" should be rewritten as "75.0", as indicated in specification at page 12, line 13.

Column 11, line 10 - delete entire line and reinsert between lines 5 and 6 as indicated in specification at page 28, lines 7-8.

Column 13, line 48 - "300" should be corrected to read "130", as indicated in specification at page 35, line 6.

PO-1050
(5/69)

UNITED STATES PATENT OFFICE
CERTIFICATE OF CORRECTION

Patent No. 3,579,636      Dated May 18, 1971

Inventor(s) IVO MAVROVIC      PAGE - 2

It is certified that error appears in the above-identified patent and that said Letters Patent are hereby corrected as shown below:

Column 14, line 72, Claim 3 - after "resulting", "amomnia" should be rewritten as "ammonia", as indicated in amendment filed April 29, 1970 at page 6, line 12 of claim 19.

Column 15, line 4, Claim 3 - after "ammonia" the period (.) should be changed to a comma (,), as indicated in amendment filed April 29, 1970 at page 7, line 19 of claim 19.

Signed and sealed this 7th day of December 1971.

(SEAL)
Attest:

EDWARD M. FLETCHER, JR.      ROBERT GOTTSCHALK
Attesting Officer      Acting Commissioner of Patents